3,302,714
CEMENTING PIPE IN WELLS
William G. Bearden and Kenneth A. Blenkarn, Tulsa, Okla., assignors to Pan American Petroleum Corporation, Tulsa, Okla., a corporation of Delaware
No Drawing. Filed Dec. 4, 1964, Ser. No. 416,123
15 Claims. (Cl. 166—21)

This invention relates to cementing casing in wells. In particular, it relates to a method for eliminating trapping of bodies of mud in the cement slurry especially in cementing multiple casing strings in a well.

For many years a problem in cementing casing in wells has been the trapping of bodies of mud in the cement slurry during the cementing operation. The problem has become particularly acute in cementing several strings of small casing side by side in a well so the well can be completed in several zones. Mud tends to become trapped between the strings of casing and between the well wall and each string of casing where the casing is close to the well wall. When there are at least three strings of casing, there is a space between the strings from which it is very difficult for the cement slurry to displace the mud. This often leads to an uncemented channel being left through which flow up or down the well outside the casing strings can occur after the cement slurry has set.

An object of this invention is to provide a method for obtaining improved casing cementing jobs. A more specific object is to provide a method for eliminating trapped pockets of mud in casing cementing operations or at least mixing the trapped mud into the cement so it will not provide continuous flow channels through the set cement. A still more specific object is to provide a method for eliminating trapped mud bodies while cementing multiple strings of casing side by side in a well.

In general, we accomplish the objects of our invention by causing the casing to buckle and thus move laterally in a well after at least a part of the cement slurry has been placed outside the casing and before the slurry has set. The lateral movement of the casing puddles the cement slurry. If this action takes place while introducing the slurry outside the casing, the bodies of mud may be released and thus eliminated. Even if the buckling is caused to occur after all the cement has been completely placed, the buckling action mixes the mud into the cement slurry. Cement slurries can tolerate a large amount of mud without being greatly alarmed. In fact, in some cementing operations bentonite is deliberately mixed into cement slurries used in cementing casing in wells.

The action is particularly effective when multiple strings are cemented. In this case the buckling action of at least one string separates it from the other strings permitting cement slurry to enter the space between the pipes. When the multiple strings are caused to buckle and straighten in sequence, and when this cycle is repeated several times, it will be apparent that any trapped mud becomes well mixed into the cement slurry and a good casing cementing job is obtained.

A casing string is caused to buckle by at least partially sealing the lower end of the casing against downward flow inside the casing, restraining downward movement of the means used to seal the casing and then applying a pressure inside the casing sufficient to cause the casing string to buckle.

Buckling of pipe by application of internal pressure has been the subject of several discussions. The bibliography in a recent paper lists most of these. This recent paper is: "Helical Buckling of Tubing Sealed in Packers" by A. Lubinski, W. S. Althouse and J. L. Logan. The paper appears in the Journal of Petroleum Technology for June 1962, pages 655 to 670.

Consider first the simplest case in which a single string of casing is to be cemented in a well. The bottom of the casing can be sealed against downward flow inside the casing by using a top cementing plug which forms such a seal when it comes to rest on the float collar or float shoe on the bottom of the casing. Downward movement of this sealing element can be restrained by setting the casing shoe on the bottom of the well. It is only necessary then to apply sufficient pressure inside the casing to cause it to buckle. Application of a pressure inside the casing as little as about 100 pounds per square inch in excess of the pressure outside the casing will be sufficient in many cases.

The pressure may be built up slowly over several minutes since movement of the pipe, however slow, causes some mixing of the mud and cement slurry outside the casing. Preferably, however, the pressure should be built up rapidly over a period of a few seconds. This causes rapid pipe movement with consequent vigorous agitation. It is also advisable, for the same reasons, to build up a pressure of about 1000 to 1500 pounds per square inch greater inside than outside the casing. In most casing cementing jobs there is little danger of permanent buckling or bending of the casing simply because the casing is of so nearly the same diameter as the well. It may be desirable to avoid pressure differences greater than about 2000 or 3000 pounds per square inch between the inside and the outside of the casing to prevent all possibilities of permanent set of the casing in the buckled condition.

The pressure differential between the inside and outside of the casing can be cycled between 1000 pounds per square inch, for example, and zero. This causes the casing string to alternately buckle and straighten, thus producing a good stirring action. Such pressure cycling is usually very easy and inexpensive since the casing is ordinarily filled with relatively incompressible liquid and is a sealed system. The pressure can be developed by a small high-pressure pump introducing a small volume of liquid inside the sealed system. Liquid is bled off from the system to reduce the pressure. Pressure can also be conveniently applied by exposing the liquid in the casing to high-pressure gas. This system has the advantage that the gas can be quickly applied to and exhausted from the casing to cause quick cycling of the casing between buckled and straight condition, thus obtaining a good stirring action.

Still considering the simplest system in which a single string of casing is cemented in a well, another arrangement at the bottom of the casing can be used with advantage. In this arrangement a slip joint is included near the bottom of the casing. Such a slip joint is shown, for example, on page 4252 of the 1964–65 Composite Catalog of Oil Field Equipment and Services, published by World Oil, Houston, Texas. This joint is placed just above the level at which the top cementing plug will come to rest.

The casing is run into the well and cement slurry is introduced around the casing. A top cementing plug seals the casing below the slip joint. The casing is then set on bottom so the slip joint is in closed position. While the cement slurry is still in an upset condition, pressure is applied to the inside of the casing. This internal pressure causes the casing to buckle. All the downward force due to the internal pressure is applied to the top plug which rests on the float shoe, which in turn is supported by the bottom of the well. As the casing buckles, the slip joint permits the casing above the slip joint to move upwardly, thus allowing unrestricted buckling to a large distance above the slip joint. Some quantitative calculations of distances of vertical movement are presented in the paper by Lubinski et al. to which reference was previously made.

These calculations show that the movement may amount to several feet in some cases.

The effects of using a slip joint in the casing can also be obtained by using a sliding seal inside the casing. The sliding seal must, of course, be supported by something other than the casing. For example, the top cementing plug can rest on the top of a rod slidably extending through the casing shoe and resting on the bottom of the well. In this case the downward force of increased pressure inside the casing string is carried by the top cementing plug and rod rather than by the bottom of the casing so the casing buckles.

As noted above, there is some advantage in causing the casing to buckle while the cement is being place outside the casing rather than after the slurry has been placed. If an orifice is used near the bottom of the casing string, it is possible to vary the pressure above this partial seal by changing the pumping rate. Thus, while the cement is being pumped through the casing and up the well outside the casing, it is possible to cause the casing to buckle and straighten by pumping rapidly and then pumping slowly or stopping pumping through the orifice in the casing.

The orifice, like other complete or partial seals, is preferably placed at least near the bottom of the casing. It can, of course, be placed up the casing as long as its position is below the final level of cement in the well. In this case downward movement of the seal will be restrained by the casing below the seal which is in turn supported by the bottom of the well. The seal will be supported at least in part by means other than the casing even though it will be supported in part by at least a portion of the casing. Therefore, the casing can be made to buckle above the seal by application of pressure inside the top of the casing.

It will be noted that in all cases described above there are three principal requirements in the process for cementing: First, the inside of the casing must be at least partially sealed against downward flow of fluids. Second, the means for sealing the casing must be restrained against downward movement at least in part by some means other than the casing string. Third, pressure is applied inside the casing before the cement slurry sets. Preferably the pressure is applied and released several times to obtain a good agitating action and thus eliminate mud channels in the cement slurry.

For purposes of simplicity the process has been described first as applied to cementing a single string of casing in a well. As previously noted, however, the principal advantage of the method lies in its application to simultaneously cementing multiple strings of casing, tubing or other pipe in a well. The different strings are ordinarily of different lengths. The bottom of the longer string can be restrained against downward movement by setting it on the bottom of the well. The shorter strings can be restrained by attaching them to a longer string. This attachment may be by means of clamps. Since the forces involved when a pipe string buckles are rather large, however, it is preferred that the strings be connected more directly. For example, multi-string anchors such as those shown and described on pages 902 and 903 of the 1964-65 Composite Catalog of Oil Field Equipment and Services may be used to connect the tubing strings.

The seals in the bottoms of the strings may be top cementing plugs. This expedient should be used if cement slurry is to be introduced through all the pipe strings. If all the cement slurry is to be pumped through the longest string, however, the shorter strings can be simply welded shut since completion of the well is ordinarily accomplished by means of perforating through the walls of the strings.

It is possible to pressure up only one of the multiple strings and rely on the buckling of this string alone to provide the agitation necessary to eliminate mud channels in the cement slurry. It is preferred, however, to alternately introduce pressure and then release the pressure in all the pipe strings in sequence. Pressure should not be introduced into all at once since this would cause all the strings to stretch approximately equally so they could not restrain downward movement of each other as they do when pressure is introduced and released in sequence. Such restraint is essential if buckling due to internal pressure is to occur.

If three pipe strings are run into a well and are attached together at the bottom of the shortest string, two of the strings will extend on down the well below this point of attachment. These two longer strings will be attached together at or near the bottom of the string of intermediate length. The longest string will then extend on to an even greater depth. If all the pipe strings are sealed at the bottom and pressure is applied and released in sequence to the three strings, they will buckle in sequence. In the case of the shortest string, buckling will take place much as in the case of the single casing string in the well. The principal difference is that when pressure is applied to the short string, this pressure applied to the bottom of the short string will tend to stretch the short string. Part of this stretching will be transferred to the other two strings, but some stretching of the short string will take place. To this extent the seal across the inside of the short pipe will be supported by the short pipe itself. The seal will also, however, be supported at least in part by means other than the short pipe, namely the longer strings of pipe. The buckling of the short string will be decreased because it stretches. For this reason it is generally important to use a little higher pressure than the minimum 100 pounds per square inch recommended for use with a single casing string in a well. A pressure difference between the inside and the outside of one of multiple strings of casing in a well should be in the range of 1,000 to 1,500 pounds per square inch preferred for the single casing string. This provides a large margin of safety to insure good buckling even of multiple strings attached together.

Now, suppose internal pressure is applied to one of the longer strings. The sections of these strings above the point of attachment to the short string will behave very much like the short string did. Downward movement of this upper portion of the longer strings will be restrained in the same way the shorter string was restrained. The internal pressure in these strings will cause buckling just as it did in the shorter string.

In the region below the shorter string, the other two strings will buckle upon separate application of internal pressure because the two strings are attached together near the bottom of the string of intermediate length. The longest string, in the region below the point of attachment to the intermediate string, will buckle only if the bottom of the casing, or more accurately, the means for sealing the bottom of the casing, is supported by some means other than the casing. For example, the bottom of the longest string may be set on the bottom of the well.

From the above explanation it will be seen that our method can be applied to multiple strings whether there are two, three, four or even more strings. It is preferred in all cases that the bottom of each pipe string be attached to all other pipes extending to at least that depth. This gives the best possible support for the seals near the bottom of the strings. The more strings there are, the more important it becomes to buckle the strings. With larger numbers of strings, it may be desirable to cause more than one to buckle at once. It also becomes more important with more strings of pipe to buckle and straighten the strings a multiplicity of times, preferably while the cement slurry is being placed.

Any string can be caused to buckle while cement is being pumped through it by placing an orifice at the bottom of the string and pumping rapidly to increase the pressure drop across the orifice and, thus, increase the pressure difference between the inside and outside of the string. When pumping is stopped, pressures inside and outside the pipe equalize and the string straightens. Thus, by use of an orifice as a partial seal inside a pipe, and by starting and stopping pumping of cement slurry, the pipe string can be caused to buckle while the slurry is being placed. Higher pressure differences can be produced by dropping a ball of deformable material, such as rubber, into the slurry occasionally. If the ball is slightly larger than the orifice, a higher pressure is required to squeeze the ball through the orifice. This higher pressure causes more buckling.

It is possible to pump cement slurry in sequence through each of the strings of pipe in the well, an orifice being used as a partial seal in the bottom of each. This pumping sequence can be cycled to cause a multiplicity of buckling and straightening of each string during placing of the slurry around the pipe in the well.

The most practical and preferred method of buckling a multiplicity of strings of pipe while cement slurry is being placed around them, is to pump all the slurry down through the longest string, which is not buckled, while buckling the other strings in sequence a multiplicity of times during the placement of the slurry. Thus, cyclic buckling in sequence is accomplished by simply increasing and decreasing the pressures inside these other strings without pumping cement slurry through them. In this system a sliding seal at the bottom of each pipe, except the longest one, can be supported from the longest pipe by some means such as bracket mounted on the longest pipe. If sliding seals are used, the pipe strings should not be attached together. This permits free vertical movement of all strings except the longest one and thus allows more effective buckling action. It will be understood that the pipes can be attached together if desired, in which case the sliding seals lose their advantage but are still as good as fixed seals.

Reference has been made to the seal for a casing string being supported by some means other than the casing. It will be understood that this does not means the casing cannot be involved in the supporting action. In the example given above, including the three strings of pipe, the sealing means in the long string should almost certainly be a top-cementing plug. This is supported by the float shoe which may not be supported by the bottom of the well. In this case the float shoe is supported by the long casing string. The casing string is supported by attachment to the other strings of casing. Thus, the sealing means for the long string and intermediate string are actually supported through the casing, but the ultimate support is, and must be, something other than the casing. In the longer strings, buckling can take place only above this other means of support.

Still other means for supporting the seal are possible. For example, a retrieving head can be attached to the top cementing plug. A wire rope with an overshot can then be run into the well and the overshot can be engaged with the retrieving head. If the wire rope is tightened and pressure is applied inside the casing string, the cementing plug, which forms the seal, is supported and restrained from downward movement at least in part by the wire rope. If sufficient pressure is applied, the casing will buckle. It is also possible to buckle and straighten the casing by simply pulling up strongly enough on the wire rope and then releasing the tension under certain circumstances. The upward pull relieves some of the internal pressure in the bottom of the casing below the cementing plug if a backflow check valve is included in the casing shoe, as is usually the case. When this valve closes, there is a greater pressure outside than inside the bottom of the casing. The result is an upward force which can cause casing buckling. The techniques using a wire rope to support the casing seal are not, in general, as advantageous as supporting the seal by other means since the strain required in the wire rope to cause any great amount of buckling must usually be several thousand pounds, for example 20,000 pounds.

All the above-described procedures will be found, upon examination, to be examples of a process in which the inside of a pipe string is at least partially sealed at a point at or near the bottom of the string. A greater pressure is then provided above the seal than below the seal. If the pressure difference is great enough, the pipe buckles. In the preferred method the pressure difference is provided by simply increasing the pressure inside the pipe. In the case using the wire rope to lift the bottom cementing plug which acts as a sliding seal, the pressure difference is provided by lifting on the plug to decrease the pressure inside the pipe below the plug.

While some of the techniques, such as the use of slip joints, and a sliding seal supported by a wire rope, seem more applicable to single casing string than to multiple strings, it will be apparent that they can also be applied to multiple strings. In the case of the slip joints, at least one of the pipe strings should not have a slip joint so it can support the portions of the other strings below the slip joints.

In order to be effective, the seal in each pipe must be at some level below the final level of cement in the well outside the pipes. The seals may all be at approximately the same level in the well. Preferably, however, the seal in each pipe should be as close as possible to the bottom of that pipe in order to cause as much as possible of the bottom portion of the string to buckle.

The order in which many of the steps of the method are carried out can be varied considerably. The seal can be placed in the casing before the casing is run into the well, as in the case of an orifice, or it can be placed after the casing is run, as in the case of a top cementing plug which is used as the seal. When multiple strings are run, they can be attached together before running, while running or after they are run. The cement can be introduced before the casing is run or afterward. The pipe or pipes can be buckled after the cement slurry is placed or during placement of the slurry. In order to accomplish the objects of the method at least some of the buckling of the pipes must, of course, take place in the cement slurry.

Many means for performing the steps of sealing the casing, supporting the seal and applying a differential pressure will occur to those skilled in the art. Those given above are described by way of example because they are the preferred means contemplated by us. Our invention should not be limited to use of these means, but only by the following claims.

We claim:

1. A method for cementing a pipe in a well comprising placing said pipe in said well, introducing cement slurry around the outside of said pipe and, before said cement slurry has set, at least partially sealing the inside of said pipe at a level below the final level of the cement in the well outside the pipe, restraining downward movement of the sealing means at least in part by a means other than said pipe, and providing a sufficiently greater pressure above said sealing means than below said sealing means to cause said pipe to buckle in said cement slurry whereby said cement slurry is puddled, thereby improving the quality of the cement job.

2. A method for cementing a pipe in a well comprising placing said pipe in said well, introducing cement slurry around the outside of said pipe and, before said cement slurry has set, at least partially sealing the inside of said pipe as a level below the final level of the cement in the well outside the pipe, restraining downward movement of the sealing means at least in part by a means other than said pipe, and increasing the pressure inside the portion of said pipe above said sealing means until said pipe buckles in said cement slurry.

3. The method of claim 2 in which a slip joint is inserted in the pipe above the sealing means to permit upward movement of the pipe above the slip joint and thus improve the buckling action.

4. The method of claim 2 in which said pressure is applied and released a plurality of times to obtain a good stirring action by successive buckling and straightening of said pipe.

5. A method for cementing a pipe in a well comprising placing said pipe in said well, introducing cement slurry around the outside of said pipe and, before said cement slurry has set, providing a fixed seal across the inside of said pipe at a level below the final level of the cement in the well outside said pipe, said fixed seal preventing upward flow of fluids, providing a sliding seal inside said pipe above said fixed seal, and lifting said sliding seal to produce a sufficiently greater pressure above said sliding seal than below said sliding seal to cause said pipe to buckle in said cement slurry.

6. A method for cementing a pipe in a well comprising placing said pipe in said well, introducing cement slurry around the outside of said pipe and, before said cement slurry has set, providing a sliding seal inside said pipe near the bottom of said pipe, supporting said sliding seal by means other than said pipe, and increasing the pressure inside the portion of said pipe above said sliding seal until said pipe buckles.

7. The method of claim 6 in which said pressure is applied and released a plurality of times to cause successive buckling and straightening of said pipe.

8. A method for cementing a pipe in a well comprising placing said pipe in said well, at least partially sealing the inside of said pipe at a level at least near the bottom of said pipe, the sealing means being at a level below the final level of cement in the well outside the pipe, restraining downward movement of said sealing means at least in part by a means other than said pipe, and, while placing cement slurry around said pipe, alternately increasing and decreasing the pressure drop across said sealing means to cause said pipe to alternately buckle and straighten during the cementing operation.

9. A method for cementing a plurality of pipes side by side in a well comprising running the pipes into the well, attaching at least two pipes together at a level near the bottom of at least one of the attached pipes, placing cement slurry around the outside of said pipes, at least partially sealing the inside of at least one of said pipes which are attached together, the sealing means being at a level below the final level of the cement in the well outside said pipes, and providing a sufficiently greater pressure above said sealing means than below said sealing means to cause said at least partially sealed pipe to buckle in said cement slurry.

10. A method for cementing a plurality of pipes of different lengths side by side in a well comprising running the pipes into the well, attaching the bottom of each pipe except the longest one to all the other pipes which extend to that particular level, placing cement slurry around the outside of said pipes, at least partially sealing each pipe at some level below the final level of the cement in the well outside said pipes, and, before said cement slurry sets, applying to the insides of said pipes a pressure sufficient to cause buckling of the pipes to which pressure is applied, said pressure being applied to less than all the pipes at once.

11. The method of claim 10 in which pressure is applied to each of the pipes in sequence and to not more than one at a time.

12. The method of claim 11 in which the action of applying and releasing the pressure is performed in each of said pipes in sequence a plurality of times to cause successive cyclic buckling and straightening of the pipes.

13. A method for cementing a plurality of pipes of different lengths side by side in a well comprising running the pipes into the well, attaching the bottom of each pipe except the longest one to all the other pipes which extend to that particular level, placing cement slurry around the outside of said pipes, at least partially sealing each pipe, except the longest one, at some level below the final level of the cement in the well outside said pipes, pumping cement slurry down through said longest pipe and up around the outside of the pipes in the well, and, while pumping said slurry through said longest pipe, applying to the insides of at least some of the other pipes a pressure sufficient to cause buckling of the pipes to which pressure is applied.

14. The method of claim 13 in which pressure is applied to each of the pipes, except the longest, in sequence and to not more than one at a time.

15. The method of claim 14 in which the action of applying and releasing the pressure is performed in each of said pipes, except the longest, in sequence a plurality of times to cause successive cyclic buckling and straightening of all pipes except the longest.

References Cited by the Examiner
UNITED STATES PATENTS

| | | | |
|---|---|---|---|
| 2,939,533 | 6/1960 | Coberly | 166—21 X |
| 3,022,823 | 2/1962 | Caldwell | 166—21 |
| 3,193,010 | 7/1965 | Bielstein | 166—21 |
| 3,239,005 | 3/1966 | Bodine | 166—23 |

CHARLES E. O'CONNELL, *Primary Examiner.*

N. C. BYERS, *Assistant Examiner.*